United States Patent
Andreasson (10) Patent No.: US 9,245,154 B2
(45) Date of Patent: Jan. 26, 2016

(54) SYSTEM AND METHOD FOR SECURING INPUT SIGNALS WHEN USING TOUCH-SCREENS AND OTHER INPUT INTERFACES

(76) Inventor: Eva Andreasson, Mountain View, CA (US)

( * ) Notice: Subject to any disclaimer, the term of this patent is extended or adjusted under 35 U.S.C. 154(b) by 434 days.

(21) Appl. No.: 13/035,632

(22) Filed: Feb. 25, 2011

(65) Prior Publication Data

US 2011/0219459 A1 Sep. 8, 2011

Related U.S. Application Data

(60) Provisional application No. 61/311,536, filed on Mar. 8, 2010.

(51) Int. Cl.
*H04L 9/32* (2006.01)
*G06F 21/83* (2013.01)

(52) U.S. Cl.
CPC ..................................... *G06F 21/83* (2013.01)

(58) Field of Classification Search
CPC ....................................................... G06F 21/83
See application file for complete search history.

(56) References Cited

U.S. PATENT DOCUMENTS

| 2009/0044025 A1 | 2/2009 | She |
| 2010/0023750 A1* | 1/2010 | Tan ............................... 713/150 |
| 2010/0058479 A1* | 3/2010 | Chen et al. ...................... 726/26 |

FOREIGN PATENT DOCUMENTS

| EP | 0989478 | 3/2000 |
| KR | 10-2008-0098153 | 11/2008 |

OTHER PUBLICATIONS

PCT International Search Report dated Nov. 9, 2011 in connection with PCT Application No. PCT/US2011/026452, 9 pages.
Rivest, R.L., Chaffing and Winnowing: Confidentiality without Encryption, MIT Lab for Computer Science, Mar. 18, 1998 (rev. Jul. 1, 1998), http://people.csail.mit.edu/rivest/chaffing-980701.txt, retrieved Mar. 27, 2013, 8 pages.

* cited by examiner

*Primary Examiner* — Brandon Hoffman
*Assistant Examiner* — Nega Woldemariam
(74) *Attorney, Agent, or Firm* — Zilka-Kotab, PC (57) ABSTRACT

A system and method for securing input signals when using input interfaces such as touch-screens and other input interfaces that are suitable for handheld, mobile, computing and other devices, by generating fake signals. In accordance with an embodiment, the technique can be used to protect input signals from, e.g. a touch-screen keyboard, and make it more difficult for malicious software applications to intercept and understand such input signals. The technique can also be implemented without requiring significant changes to the underlying operating system (OS) or graphical user interface (GUI). In accordance with an embodiment, a security enhancer or security enhancing application injects fake signals into the OS/GUI input signals queue. The security enhancer or security enhancing application is also associated with a communication channel that allows it to establish a cryptographic signature or key with authorized or sensitive application receivers that are authorized to receive the input signals. The fake signals can later be removed from the input signal stream only by the authorized receivers of the input signals. Unauthorized application listeners may be able to intercept a signal, but are unable to determine the original input.

17 Claims, 8 Drawing Sheets

SYSTEM AND METHOD FOR SECURING INPUT SIGNALS WHEN USING TOUCH-SCREENS AND OTHER INPUT INTERFACES

CLAIM OF PRIORITY

This application claims the benefit of priority to U.S. Provisional Patent Application titled "SYSTEM AND METHOD FOR PROVIDING INPUT SIGNAL PROTECTION USING FAKE INPUT CREATION"; Application No. 61/311,536; filed Mar. 8, 2010, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to input interfaces such as touch-screens and other interfaces that are suitable for handheld, mobile, computing and other devices, and are particularly related to a system and method for securing input signals when using such interfaces, by generating fake signals.

BACKGROUND

Nowadays, many handheld, mobile, computing and other devices, for example smartphones, personal digital assistants (PDA) and handheld computers, use an input interface such as a touch-screen as the default input and output method for human/user interaction. This allows for efficient use of the physical real estate of the device, since the same physical area (e.g. the display screen) can be used both for input and output depending on the state of the software running on the device.

At the same time, handheld computing devices have become increasingly more powerful, so that they now rival the capabilities of full-fledged personal computers. A consequence of this is that most modern devices no longer use older-style, limited and locked down operating systems (OS), but instead use slightly reduced versions of full-blown operating systems, such as GNU/Linux or Berkeley Software Distribution (BSD) Unix, which are necessary to make full use of the computing power in these devices.

This progress has made it significantly more difficult for software programmers to establish a safe environment for entering secure data into the device, for example user passwords, personal identification numbers (PIN), bank account numbers, and social security numbers. In older-style, limited handheld devices, the more limited hardware and operating system made it possible to control the entire handheld device from a single application, and so an application for communicating with a bank could be reasonably sure that it was running alone on the device, and that no other application could intercept the data traffic. However, this is not the case with modern handheld computing devices, which offer a modern operating system that allows several applications to be running at the same time.

Additionally, the graphical user interface (GUI) is usually provided as a separate library outside of the operating system. This GUI library is typically quite large and complex, and is not always designed to prevent different applications from examining the graphical state of other applications. Even if it was designed to prevent applications from accessing each others graphical state, there can be mistakes in the design or bugs that allow this to happen anyway. Larger, more complex, operating systems also make it easier for potential mistakes in the application programmer interfaces (API) or bugs to slip into the operating system. These mistakes can also make it easier for unauthorized or malicious applications, such as computer viruses, trojan software, and other malware, to monitor the input and output of other, authorized, applications.

Furthermore, since modern handheld computing devices offer the possibility of downloading and installing many different applications onto the device, for example through purchasing additional applications, this makes it easier for malicious intruders to acquire sensitive data or information from the device. The user simply has to be tricked into installing a malicious application. Such an application might otherwise perform a valid service—however, unbeknownst to the user, the malicious application can acquire sensitive data or information from the user, not by hacking the other applications or the OS/GUI, but simply by interacting with the graphical state available to it through the standard OS/GUI API. This form of threat has existed for some time on desktop computers as well; however in those environments the problem can be somewhat mitigated by installed anti-virus software. Handheld computing devices are generally not yet powerful enough to run such anti-virus software regularly.

The problems are compounded in that many handheld computing devices use an input interface such as a touch-screen as the default input and output method. Since the only input that arrives from the touch-screen hardware are display coordinates, the operating system can no longer see the difference between drawing a point in a drawing program and entering a number as part of a PIN—it depends entirely on what image is drawn on the touch-screen. Thus the operating system can no longer assist in protecting input signals from the keyboard, because there is no physical keyboard. This risk could allow intruders to acquire sensitive data or information from users of computing devices with touch-screens by intercepting the signals from the touch-screen, either inside the OS, or by listening to the same signal stream from the GUI. These are the areas that embodiments of the invention are intended to address.

SUMMARY

Disclosed herein is a system and method for securing input signals when using input interfaces such as touch-screens and other input interfaces that are suitable for handheld, mobile, computing and other devices, by generating fake signals. In accordance with an embodiment, the technique can be used to protect input signals from, e.g. a touch-screen keyboard, and make it more difficult for malicious software applications to intercept and understand such input signals. The technique can also be implemented without requiring significant changes to the underlying operating system (OS) or graphical user interface (GUI). In accordance with an embodiment, a security enhancer or security enhancing application injects fake signals into the OS/GUI input signals queue. The security enhancer or security enhancing application is also associated with a communication channel that allows it to establish a cryptographic signature or key with authorized or sensitive application receivers that are authorized to receive the input signals. The fake signals can later be removed from the input signal stream only by the authorized receivers of the input signals. Unauthorized application listeners may be able to intercept a signal, but are unable to determine the original input.

DETAILED DESCRIPTION

As described above, nowadays, many handheld, mobile, computing and other devices, for example smartphones, personal digital assistants (PDA) and handheld computers, use an input interface such as a touch-screen as the default input and output method for human/user interaction. However, it has become significantly more difficult for software programmers to establish a safe environment for entering secure data into the device, for example user passwords, personal identification numbers (PIN), bank account numbers, and social security numbers. Even if the device is designed to prevent applications from accessing each others graphical state, there can be mistakes in the design or bugs that allow this to happen anyway. Unbeknownst to the user, a malicious application can acquire sensitive data or information simply by interacting with the graphical state available to it through the standard operating system (OS) or graphical user interface (GUI) application program interface (API). Intruders can potentially acquire sensitive data or information from users of computing devices with touch-screens by intercepting the signals from the touch-screen, either inside the OS, or by listening to the same signal stream from the GUI.

To address this, disclosed herein is a system and method for securing input signals when using input interfaces such as touch-screens and other input interfaces that are suitable for handheld, mobile, computing and other devices, by generating fake signals. In accordance with an embodiment, the technique can be used to protect input signals from, e.g. a touch-screen keyboard, and make it more difficult for malicious software applications to intercept and understand such input signals. The technique can also be implemented without requiring significant changes to the underlying operating system (OS) or graphical user interface (GUI). In accordance with an embodiment, a security enhancer or security enhancing application injects fake signals into the OS/GUI input signals queue. The security enhancer or security enhancing application is also associated with a communication channel that allows it to establish a cryptographic signature or key with authorized or sensitive application receivers that are authorized to receive the input signals. The fake signals can later be removed from the input signal stream only by the authorized receivers of the input signals. Unauthorized or malicious application listeners may be able to intercept a signal, but are unable to determine the original input.

Figure 1:
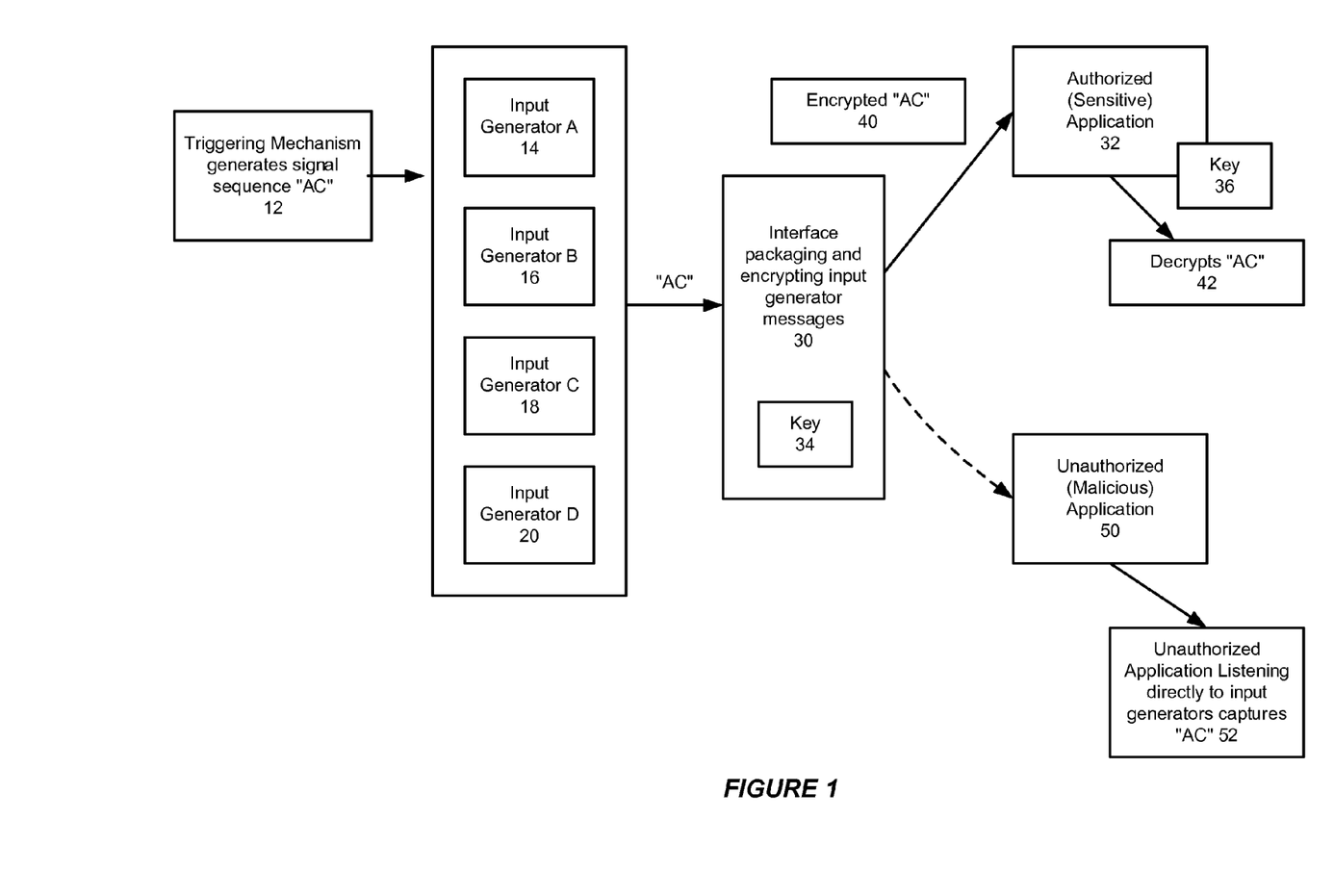
FIG. 1 shows an illustration of a system in accordance with an embodiment.

FIG. 1 shows an illustration of a system in accordance with an embodiment. As shown in FIG. 1, a user can use, e.g. a touch-screen keyboard or similar interface to type or generate 12 a password or other data to access a password protected account, indicated in FIG. 1 by input or signal generators A through D (14 through 20 respectively). The password (in this example the sequence of signals representing the letters "AC") is encrypted by the interface packaging and encrypting the input generator signals 30, using a shared key 34, before sending the appropriate signals 40 to an authorized or sensitive application 32 also having the shared key 36, where they can be decrypted to recover the original input 42. In accordance with an embodiment, when the password is sent to the receiving party, each of the key strokes that are used to type the password generate a signal event that contains data leading to what key was pressed (e.g. the corresponding coordinates of the touch-screen pad, or the key id of a keyboard, etc). If an unauthorized third-party or malicious application 50 listens to those signal events and collects them (illustrated in FIG. 1 by the dashed line), then it will be very easy to gather the user's password 52, and use this data for undesirable identity violations. The problem can thus be summarized as: how do you protect an external interface and/or action triggered input, signals, and events from being collectable or interpretable by other listeners, processes, or consumers than the intended receivers of that input or those events?

Figure 2:
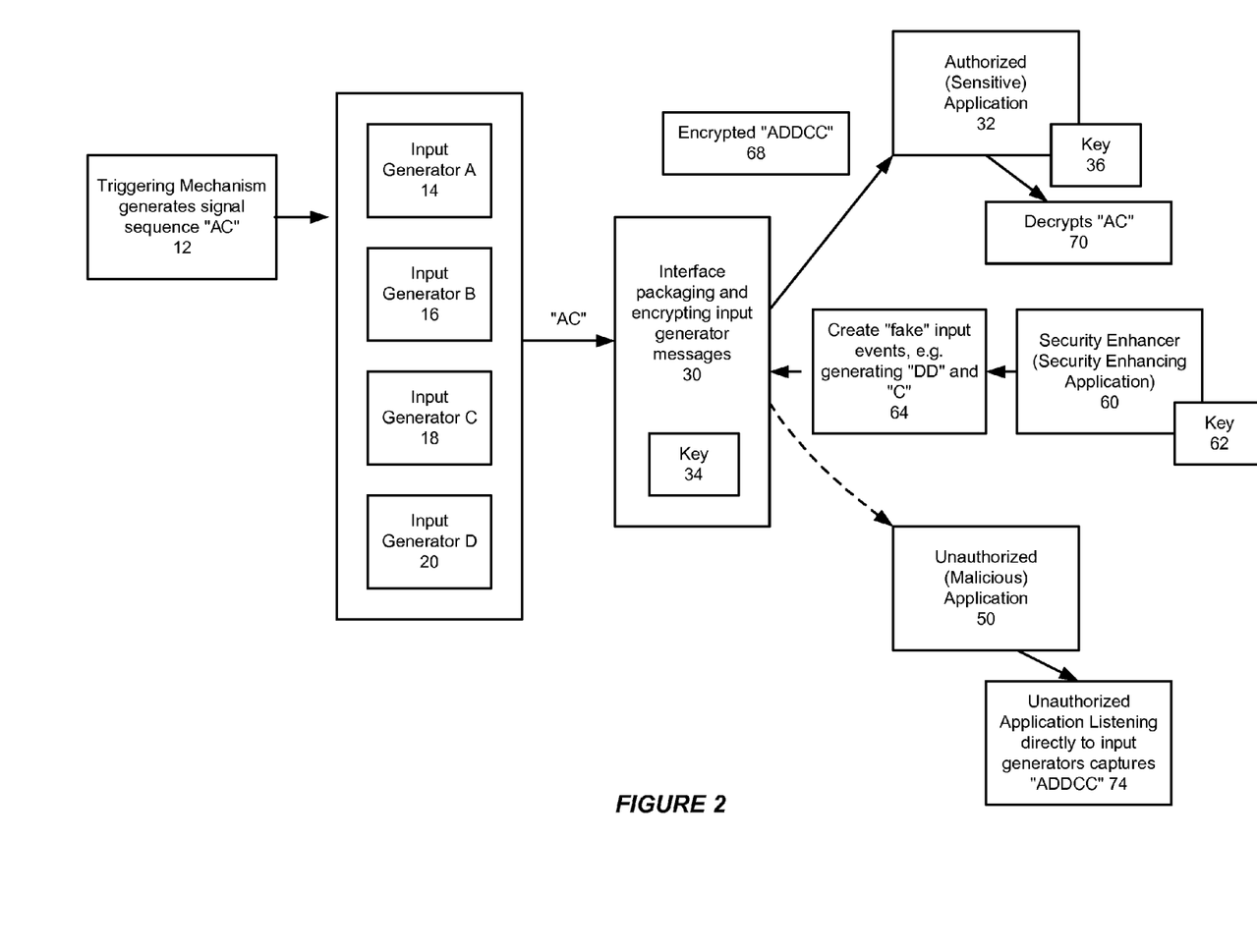
FIG. 2 shows an illustration of a system which uses fake input creation, in accordance with an embodiment.

FIG. 2 shows an illustration of a system which uses fake input creation, in accordance with an embodiment. As shown in FIG. 2, in accordance with an embodiment, the system includes a security enhancer (or security enhancing application) 60, which also has the shared key 62 and which creates fake input signal events 64 (e.g. "DD" and "C") and, by randomly adding these fake signal events to the stream of real events, creates a signal 68 with enough noise (e.g. "ADDCC") to make it difficult, or impossible to observe the true input signal for any unauthorized or malicious listener, consumer, or component other than the authorized receivers or authorized listeners. For example, as illustrated in FIG. 2, while an unauthorized third-party or malicious application would collect the modified (including fake) signal events "ADDCC" 72, the authorized or sensitive application would be able to determine the true input signal "AC" 70. In accordance with an embodiment, the system can use a technique such as that described in "Chaffing and Winnowing: Confidentiality without Encryption", by Ronald L. Rivest, MIT Lab for Computer Science, Mar. 18, 1998 (rev. Jul. 1, 1998), incorporated herein by reference, which allows separating valuable "wheat" input signals from fake "chaff" signals or noise.

In accordance with various embodiments, there can be variations in how the method is implemented. For example, to exemplify one approach of how to disguise input signal sequences with fake event noise, one can tag input and events with e.g., meta data constructs, signaling bits, event flags, field values, or other event information. The tagging information should be encrypted in a way that only an authorized receiving party would be able to decrypt and hence interpret which signals, packages, and/or events are the true events to process, and which events are "fake". Furthermore, if any unauthorized third-party could listen to a stream of input events where the signal would be full of fake input, it would still appear "real" for anyone who did not have the encryption key. This means it would be difficult, or impossible to separate the true events from the "fake" events. Only authorized receivers or authorized listeners with access to the encryption key for the tagging would be able to separate true from fake events. Hence, the system and method as described above can be used to provide a noise disturbed signal, which still appears real to the unauthorized parties, and hence makes it much harder for any unauthorized party to extract any relevant data from input, events and signals.

Various different embodiments can use variations of the above techniques. For example, in accordance with different embodiments:

The fake signals can be added by the OS/GUI software.
The fake signals can be added by the touch-screen hardware.
The communication channel can be established between the authorized or sensitive application and the OS/GUI.
The authorized or sensitive application can be a remote application running on a web server.
The communication channel can be established between the remote authorized or sensitive application and the OS/GUI by using an image with embedded signature information.
The communication channel can be established between the remote authorized or sensitive application and the touch-screen hardware by using an image with embedded cryptographic signature information.
The information that is used to discern valid signals from fake signals can be encoded in the coordinates of the touch signals and their timestamps.
The information that is used to discern valid signals from fake signals can be added to the existing events by extending their size.
The valid signals can be encrypted by the OS/GUI or the touch-screen hardware based on the previously established cryptographic data.

These and other variations will be evident from the description of various embodiments that are provided below.

Figure 3:
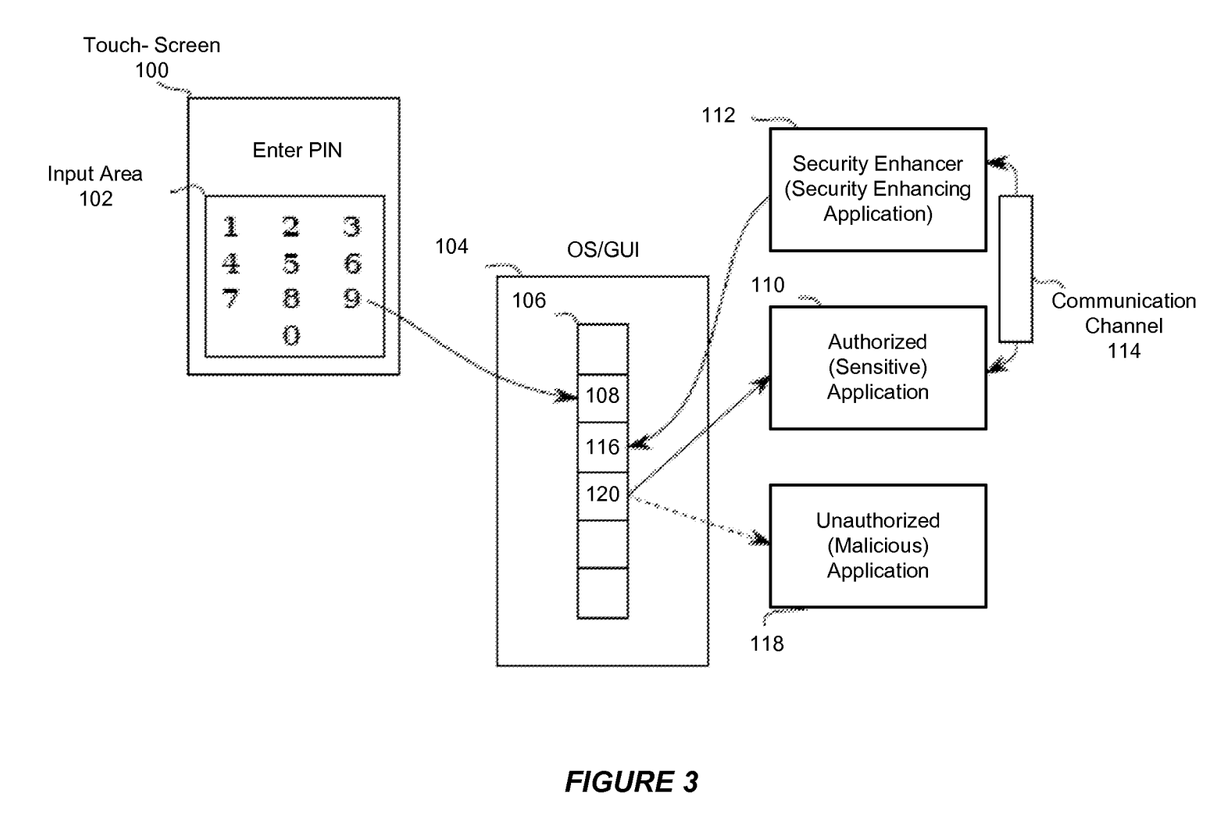
FIG. 3 shows an illustration of how a security enhancing application can provide protection against an unauthorized or malicious application eavesdropping on touch-screen signals, in accordance with an embodiment.

FIG. 3 shows an illustration of how a security enhancing application can provide protection against an unauthorized or malicious application eavesdropping on touch-screen signals, in accordance with an embodiment. As shown in FIG. 3, in this example a touch-screen 100 displays a message to the user that a PIN should be entered, for relay to an authorized or sensitive application 110. The displayed area of the touch-screen makes the area 102 into an input area for the input of sensitive data or information. When the user touches, e.g. the digit "9", a corresponding signal is sent through the OS/GUI 104 into an event queue, where the signal is stored 108. In accordance with an embodiment, the authorized or sensitive application has already communicated with a security enhancer or security enhancing application 112 using a communication channel 114, to establish a cryptographic signature that will enable the authorized or sensitive application to discern between valid and fake signals. The fake signal 116 is inserted into the same event queue by the security enhancing application. A malicious or otherwise unauthorized application 118 can examine the graphical state of the touch-screen 100 and non-disruptively listen to the event queue. However when it fetches the same signal 120 (as the authorized application) the unauthorized application is unable to discern whether or not this is a valid signal.

The effectiveness of this particular embodiment relies on the fact that a secure/safe communication channel can be established between the authorized or sensitive application and the security enhancing application, and that the malicious or unauthorized application cannot simply read any memory, be it OS/GUI, security enhancing application or authorized or sensitive application. As described above, this is not that unusual since information leaks can be created by the need for different applications to cooperate when using the touch-screen. For example, applications might want to take screen shots of other applications, or helper applications might want to modify the signals from the touch-screen to improve usability for elderly people with shaky hands. In accordance with an embodiment, the information from the touch-screen to the authorized or sensitive application can be encrypted using the chaffing and winnowing technique described above.

Figure 4:
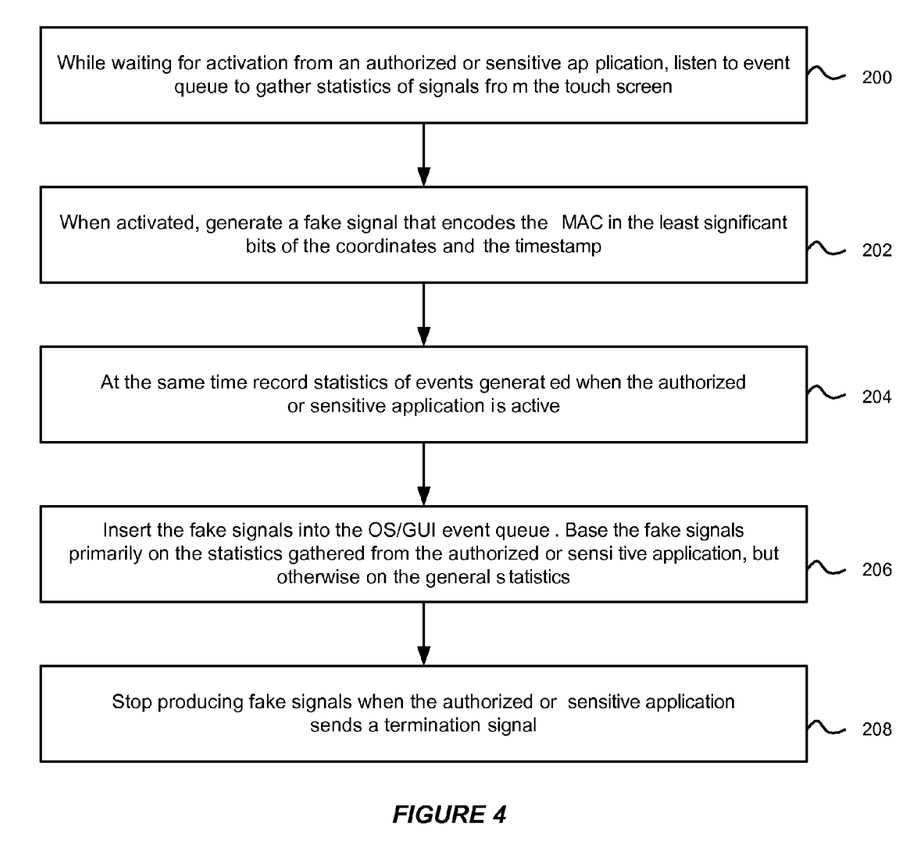
FIG. 4 shows a flowchart of a method for using a security enhancing application with a cryptographic MAC (message authentication code), in accordance with an embodiment.

FIG. 4 shows a flowchart of a method for using a security enhancing application with a cryptographic MAC (message authentication code), in accordance with an embodiment. As shown in FIG. 4, in step 200, the security enhancer or security enhancing application gathers statistics of where the user touches the screen, by monitoring the event queue in the same way as a malicious or otherwise unauthorized application might do. When the authorized or sensitive application requires the security enhancing application to chaff the signals in the event queue, it will start generating fake signals.

In step 202, the fake signals contain a MAC (message authentication code) that is encoded into the least-significant bits in the coordinates and the timestamp. If a touch signal encodes the X and Y coordinates into 32-bit floats, and the timestamp aligned to milliseconds, it is possible to use approximately 8-bits in each coordinate and 4-bits the timestamp, for a total of 20 bits per MAC. Such a short MAC would be useless for chaffing large amounts of normal data, but is perfectly satisfactory for chaffing touch signals from a human hand, since these are entered comparatively slowly and contain relatively little information. In this context, the "wheat" in the event queue is of course the real touch signals acquired from the touch-screen.

In step 204, while the chaffing is being performed the security enhancing application gathers additional statistics, to be able to create even better touch signals. This is important because if the malicious or unauthorized application can somehow identify fake signals (for example if they always are too far away from the centers of the digits), then the malicious or unauthorized program could winnow away the chaff without understanding the MAC. It is therefore important that the fake signals are as similar to the real signals as possible. In accordance with an embodiment, by encoding the MAC into the least-significant bits, the MAC will look like normal human perturbations since the human finger rarely is put down exactly in the same position every time.

In step 206, the fake signals are continuously inserted into the OS/GUI event queue using a rate of insertion that is significantly higher than the real signals, to allow the real signals to be lost in the noise.

In step 208, when the authorized or sensitive application sends a termination signal to the security enhancing application, the need for protected input no longer exists, and the security enhancing application can go back to monitoring the event queue to gather statistics.

Figure 5:
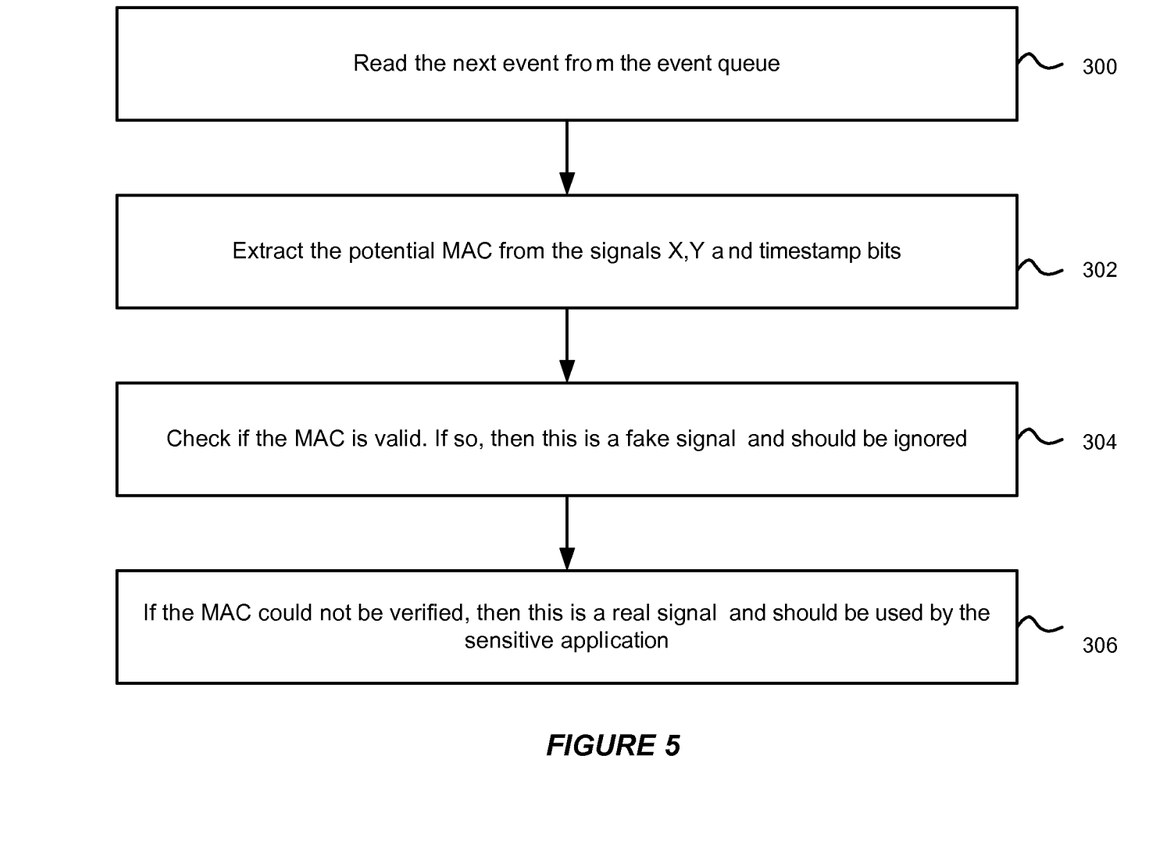
FIG. 5 shows a flowchart of a method for enabling an authorized or sensitive application to detect if a signal is fake by examining the MAC, in accordance with an embodiment.

FIG. 5 shows a flowchart of a method for enabling an authorized or sensitive application to detect if a signal is fake by examining the MAC, in accordance with an embodiment. As shown in FIG. 5, in step 300, the authorized or sensitive application acquires the next signal from the event queue.

In step 302, the authorized or sensitive application extracts the bits that might potentially be a valid MAC from the least significant bits of the X, Y coordinates and the timestamp.

In step 304, the system determines if the MAC is valid using the cryptographic signature previously established through the communication channel between the authorized or sensitive application and the security enhancing application. If the MAC is valid, then this is most likely a fake signal, and the signal should be discarded.

In step 306, however if the MAC is not valid, then the signal must be a real signal that should be used by the authorized or sensitive application.

Message authentication codes and the process of establishing a cryptographic signature used to create such codes are well known in the cryptographic literature. One such suitable signature is the well known HMAC-SHA1. In accordance with an embodiment, the input to the HMAC-SHA1 can be the generated fake signal with the bits allocated for the MAC zeroed out. The output of the HMAC-SHA1 is then truncated from its original 160 bits, into the 20 bits that fit into the MAC bits inside the signal.

Figure 6:
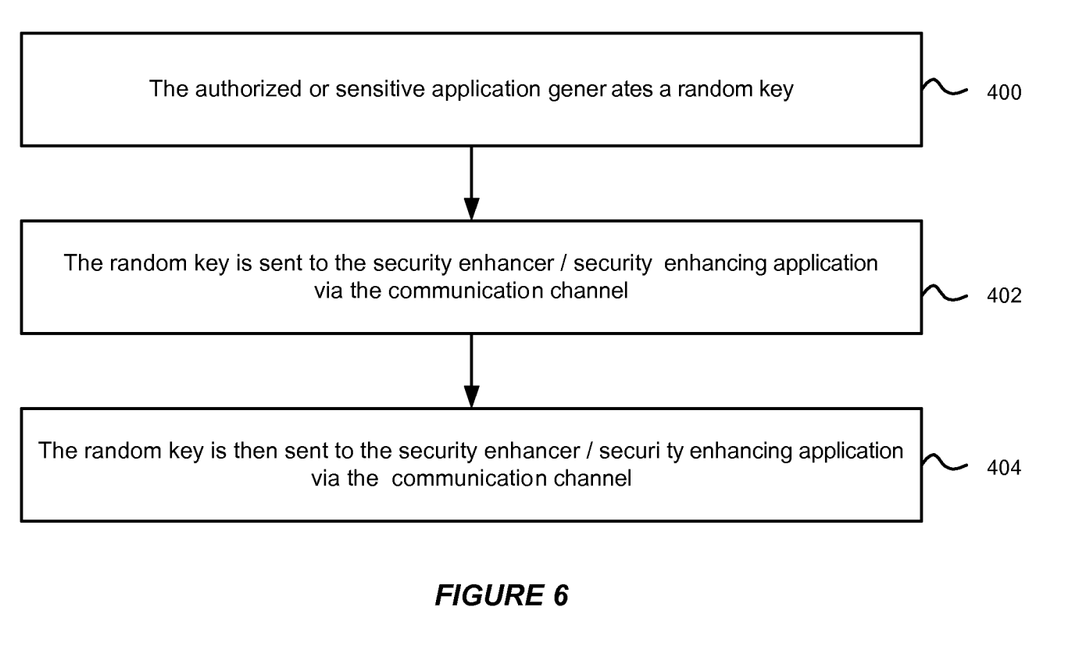
FIG. 6 shows a flowchart of a method for enabling an authorized or sensitive application to establish a shared secret key with a security enhancing application suitable for use with, e.g. HMAC-SHA1 as the MAC generator, in accordance with an embodiment.

FIG. 6 shows a flowchart of a method for enabling an authorized or sensitive application to establish a shared secret key with a security enhancing application suitable for use with, e.g. HMAC-SHA1 as the MAC generator, in accordance with an embodiment. As shown in FIG. 6, in step 400, the authorized or sensitive application generates a suitable key for HMAC-SHA1, for example 256 random bits.

In step 402, the key is sent through the communication channel to the security enhancer or enhancing application. Such a communication channel can be OS specific inter-process communication or a local tcp/ip socket, or other similar means.

In step 404, both applications now share the same key usable for HMAC-SHA1 chaffing. If changes to the OS/GUI software are acceptable and possible to perform, then the security enhancing application can be executed as part of the OS/GUI and need not exist as an external application. If changes to the touch-screen hardware are acceptable and possible, then the security enhancing application can be embedded in the actual hardware. Thus the communication channel can be used to transfer the key from the authorized or sensitive application, via the OS/GUI into the touch-screen hardware. This reduces the risk for attacks when there are potential bugs in the OS/GUI that the malicious software can use to examine the state of some other applications (but not the authorized or sensitive application).

If changes to the OS/GUI or the touch-screen hardware were acceptable and possible, then instead of chaffing the signals, they can be fully encrypted using for example the well known encryption AES. Only the authorized or sensitive application outside of the OS/GUI or the hardware, has the encryption key and can therefore decrypt the signals from the touch-screen. When a signal is encrypted, it must still fit within the normal signal format, i.e. it is the X,Y and milli-seconds of the timestamp that can be encrypted. If changes to the actual format of the signals are acceptable then the MAC can be appended to the signal by increasing its size to accommodate the MAC. By increasing the size of the MAC the risk for accidentally treating a signal as a fake signal can be reduced. However, even with 20 bits for the signal there is only one chance in a million (2 to the power of 20) that a signal will accidentally look like a fake signal.

Figure 7:
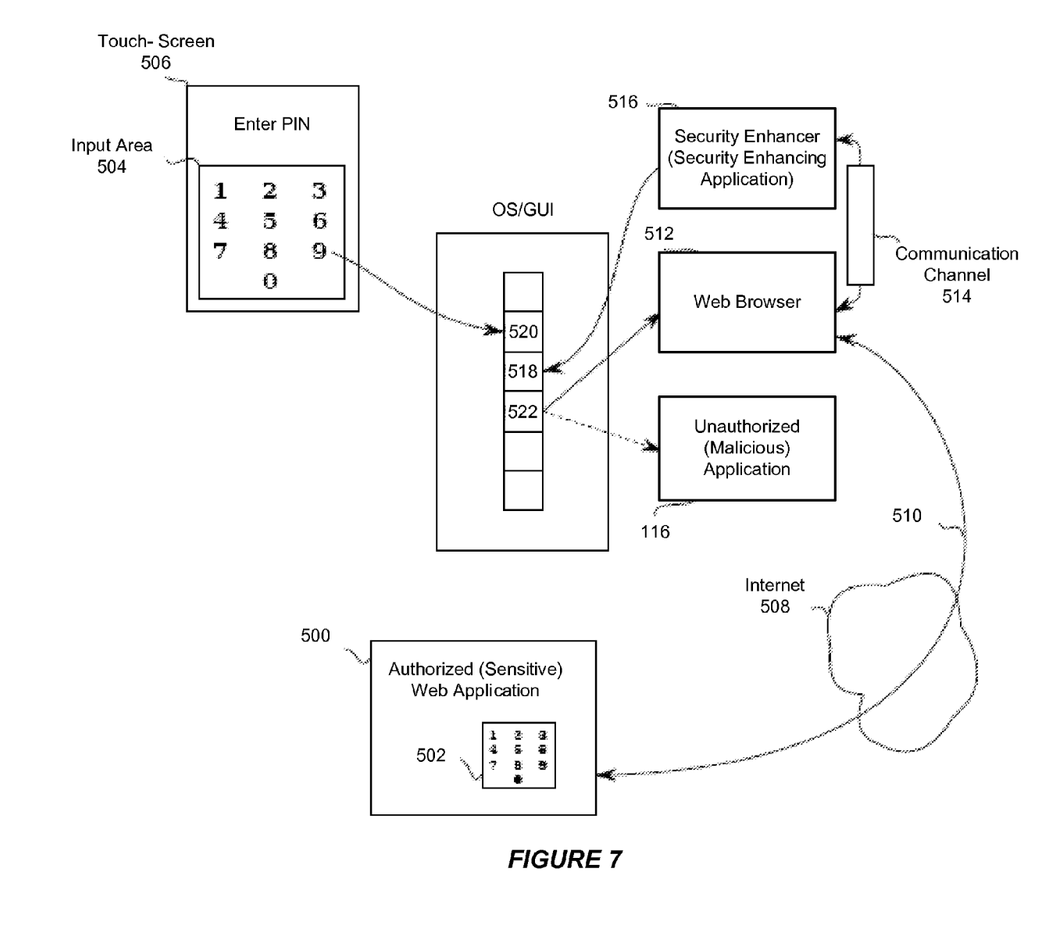
FIG. 7 shows an illustration of a system that enables a cryptographic signature to be established between an authorized or sensitive application executing on a remote web server and a security enhancing application, in accordance with an embodiment.

FIG. 7 shows an illustration of a system that enables a cryptographic signature to be established between an authorized or sensitive application executing on a remote web server and a security enhancing application, in accordance with an embodiment. As shown in FIG. 7, the authorized or sensitive application 500 can be running as a web application on a remote web server. In this example, the authorized or sensitive application wants to establish a shared key, and encodes the necessary cryptographic data into the headers of a .png image 502 that is then sent to be the background 504 of the sensitive input field on the touch-screen 506.

Such headers might also include precalculated statistics suitable for generating fake signals by a human user touching the sensitive input field.

In accordance with an embodiment, the secured web page is sent through the Internet 508 using the encrypted https protocol 510 to the web browser application 512 running on the handheld computing device. The web browser can detect, by examining the headers of the png image, that the external secured web application wants to enable a sensitive input field. The web browser can use the communication channel 514 to send the cryptographic data from the headers to the security enhancing application 516, which can then use the cryptographic data to create a suitable key.

Then, in accordance with an embodiment, fake signals 518 are generated and mixed with real signals from the touch-screen 520, and, when the signal 522 is picked up from the event queue by the web browser, it is relayed as any other signal to the authorized or sensitive application that decides if the signal is real or fake. The malicious application is, as before unable to decide if a signal is real or fake. The security can be further enhanced by duplicating the information located in the png headers and insert the same information into the least significant bits of the png image itself.

The process of inserting information into an image with little visible change to the human eye is well known as steganography. In this case, even the existence of the information need not be hidden, it only need to exist and not disturb the appearance too much. Such an image can be detected by the OS/GUI or even by the touch-screen hardware itself. When such an image is displayed, the OS/GUI or even the touch-screen hardware will generate encrypted signals automatically based on the information in the image.

Figure 8:
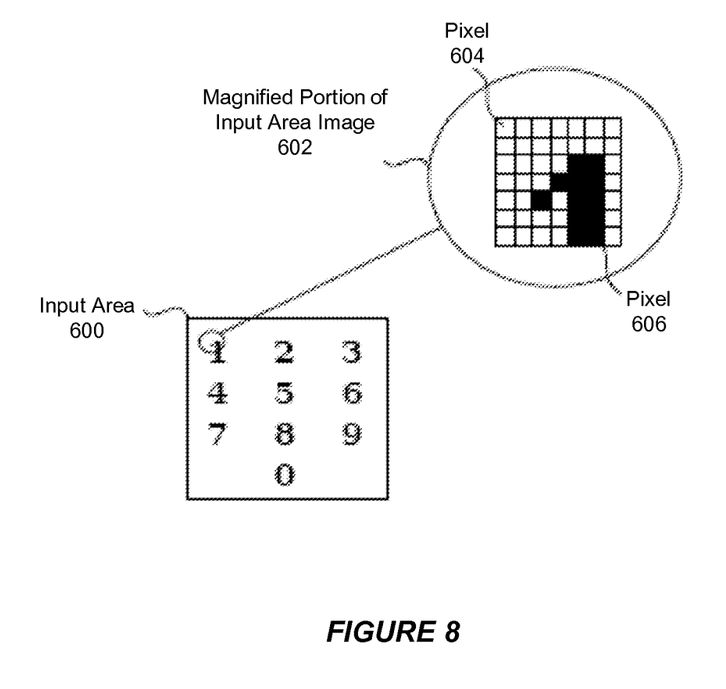
FIG. 8 shows an illustration of a system that enables a cryptographic data necessary to establish a shared secret to be encoded into the pixels in an e.g., png image, in accordance with an embodiment.

FIG. 8 shows an illustration of a system that enables a cryptographic data necessary to establish a shared secret to be encoded into the pixels in an e.g., png image, in accordance with an embodiment. As shown in FIG. 8, the image 600 visualizing the sensitive input area for PINs sent from a remote secured web application encodes data into the least significant bits of the pixels. A detailed magnification 602 of the pixels might show, e.g. that the pixel 604 is not quite white, or that the pixel 606 is not quite black. In accordance with an embodiment, these visual changes are the result of the cryptographic data encoded in the least significant bits of the pixels. A sequence of such pixels can be detected by either the OS/GUI or preferably, by the touch-screen hardware itself. From the embedded data, the height and width of the sensitive input can be extracted as well as a public key for an asymmetric cipher, for example the well known RSA. The OS/GUI or the touch-screen hardware can now generate a key for a symmetric cipher (for example AES), encrypt the symmetric key using the public key extracted from the pixels. The encrypted symmetric key can then be sent using fake signals to the authorized or sensitive application. Only the authorized or sensitive application can decrypt the symmetric key using its private key. After the establishment of the shared secret symmetric key, all signals emitted from the touch-screen area marked as sensitive are encrypted using the symmetric key. In accordance with an embodiment, it must be possible for the authorized or sensitive application to detect that the encryption, be it chaffing or real encryption, is in use. Thus if a malicious application simply overwrites the window slightly to avoid the hardware to detect the embedded cryptographic data, then the authorized or sensitive application will detect that it no longer receives fake signals or properly encrypted signals. Thus terminating the connection immediately.

In accordance with this particular embodiment, a secure channel has been established between a secured web application and the touch-screen hardware of the handheld computing devices. This has been achieved without modifying any already established protocol for transmitting touch-screen signals.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. Although the embodiments described above illustrate use in a handheld, mobile, computing and other device environment, in accordance with other embodiments, the techniques can be similarly applied to other environments, such as with desktop computers, servers, netbooks, PDA's, telephones, and other computer environments. It is intended that the scope of the invention be defined by the following claims and their equivalence.

What is claimed is:

1. A system for providing input signal protection using fake input creation, comprising:
a computer including:
at least one of a display and an output device; and
a software application having an input area configured to provide input signals as a stream of events, for communication to one or more authorized and/or sensitive applications;
a security enhancing application configured to:
establish a communication channel with the one or more authorized and/or sensitive applications, for sharing of key information; and
create fake input and add one or more fake events to the stream of events to create noise and hide true input signals from unauthorized application listeners;
wherein, in response to a user entering input into the input area, the fake input is created by the security enhancing application according to the key information,
wherein the one or more authorized and/or sensitive applications subsequently use the key information to access the true input signals,
wherein each of the one or more authorized and/or sensitive applications and the security enhancing application use the communication channel to communicate a shared key, which is used by the security enhancing application to control how the one or more fake events are added to the stream of events, and by the one or more authorized and/or sensitive applications to discern the true input signals from the fake input,
wherein the one or more authorized and/or sensitive applications are used with a web application which, in response to receiving a request from the user to access the web application, is configured to provide the key information to the security enhancing application in order to protect communication between the web application and the software application,
wherein the computer includes a touch-screen input interface, wherein in response to receiving the request from the user to access the web application, the web application incorporates the key information for use by the security enhancing application into an image that is communicated to the system and displayed on the touch-screen input interface.

2. The system of claim 1, wherein the touch-screen input interface is the primary input and output interface for human/user interaction with the computer and the one or more authorized and/or sensitive applications.

3. The system of claim 2, further comprising a hardware component which controls the touch-screen input interface, the hardware component being configured to also add one or more additional fake events to the stream of events to create additional noise and hide the true input signals from unauthorized application listeners.

4. The system of claim 1, wherein the security enhancing application is configured to monitor the true input signals to gather statistics used to improve creation of fake events during periods when fake events are not being added to the stream of events.

5. The system of claim 1, wherein one or more input generators are provided as part of an original environment, and wherein the security enhancing application is provided for use with the original environment to add input signal protection, without modifying the original environment.

6. The system of claim 1, wherein the communication channel is established between the security enhancing application and the software application using an image that is displayed on the touch-screen input interface with embedded signature information.

7. The system of claim 1, wherein the one or more fake events are added to the stream of events at a rate relatively higher than a rate at which the true input signals are added to the stream of events.

8. A method for providing input signal protection using fake input creation, the method comprising:
establishing, using a security enhancing application executed using a processor of a mobile computing device, a communication channel with one or more authorized and/or sensitive applications;

sharing key information with the one or more authorized and/or sensitive applications using the security enhancing application;

creating fake input according to the key information, using the security enhancing application, in response to a user entering input into an input area of a software application configured to provide input signals as a stream of events for communication to the one or more authorized and/or sensitive applications;

adding one or more fake events to the stream of events, using the security enhancing application, to create noise and hide true input signals from unauthorized application listeners; and accessing, using the one or more authorized and/or sensitive applications, the true input signals using the key information in a subsequent operation, wherein each of the one or more authorized and/or sensitive applications and the security enhancing application use the communication channel to communicate a shared key, which is used by the security enhancing application to control how the one or more fake events are added to the stream of events, and by the authorized and/or sensitive applications to discern the true input signals from the fake input, and wherein the one or more authorized and/or sensitive applications are used with a web application which, in response to receiving a request from the user to access the web application, provides the key information for use by the security enhancing application in protecting communication with the web application, and wherein the mobile computing device includes a touch-screen input interface, and wherein in response to receiving the request from the user to access the web application, the web application incorporates the key information for use by the security enhancing application into an image that is communicated to and displayed on the touch-screen input interface.

9. The method of claim 8, wherein the one or more fake events are added to the stream of events at a rate relatively higher than a rate at which the true input signals are added to the stream of events.

10. The method of claim 8, wherein the touch-screen input interface is a default input and output interface for human/user interaction with the mobile computing device and the one or more authorized and/or sensitive applications.

11. The method of claim 8, wherein one or more input generators are provided as part of an original environment, and wherein the security enhancing application is provided for use with the original environment to add input signal protection, without substantially modifying the original environment.

12. The method of claim 8, further comprising, during periods when fake events are not being added to the stream of events, monitoring the true input signals using the security enhancing application to gather statistics used to improve creation of fake events.

13. A non-transitory computer readable medium, including instructions stored thereon which when read and executed by one or more computers cause the one or more computers to perform a method comprising:

providing a software application having an input area for providing input signals as a stream of events, for communication to one or more authorized and/or sensitive applications; and providing a security enhancing application that:
establishes a communication channel with the one or more authorized and/or sensitive applications, for sharing of key information; and creates fake input and adds one or more fake events to the stream of events to create noise and hide true input signals from unauthorized application listeners;

wherein, upon a user entering input into the input area, the security enhancing application creates the fake input according to the key information, wherein the one or more authorized and/or sensitive applications subsequently uses the key information to access the true input signals from the stream of events, wherein each of the one or more authorized and/or sensitive applications and the security enhancing application use the communication channel to communicate a shared key, which is used by the security enhancing application to control how the one or more fake events are added to the stream of events, and by the authorized and/or sensitive applications to discern the true input signals from the fake input, wherein the one or more authorized and/or sensitive applications are used with a web application which, in response to receiving a request from the user to access the web application, provides the key information to the security enhancing application in order to protect communications between the web application and the software application, and wherein the one or more computers include a touch-screen input interface, wherein in response to receiving the request from the user to access the web application, the web application incorporates the key information for use by the security enhancing application into an image that is communicated to the one or more computers and displayed on the touch-screen input interface.

14. The non-transitory computer readable medium of claim 13, wherein the one or more fake events are added to the stream of events at a rate relatively higher than a rate at which the true input signals are added to the stream of events.

15. The non-transitory computer readable medium of claim 13, wherein the security enhancing application is configured to monitor the true input signals to gather statistics used to improve creation of fake events during periods when fake events are not being added to the stream of events.

16. The non-transitory computer readable medium of claim 13, wherein one or more input generators are provided as part of an original environment, and wherein the security enhancing application is provided for use with the original environment to add input signal protection, without modifying the original environment.

17. The non-transitory computer readable medium of claim 13, wherein the shared key is encoded within least significant bits of coordinate data for touch signals and timestamp data associated with each touch signal.

\* \* \* \* \*